United States Patent

[11] 3,542,354

| [72] | Inventor | Paul Fitzpatrick<br>Bloomfield Hills, Michigan |
|---|---|---|
| [21] | Appl. No. | 736,435 |
| [22] | Filed | June 12, 1968 |
| [45] | Patented | Nov. 24, 1970 |
| [73] | Assignee | Micromatic Hone Corporation<br>Detroit, Michigan |

[54] NONDISTORTIVE WORK HOLDING FIXTURE
3 Claims, 5 Drawing Figs.

[52] U.S. Cl................................................... 269/22,
279/4, 269/287
[51] Int. Cl...................................................... B23g 3/08
[50] Field of Search............................................ 269/20, 22,
287; 279/2, 4, 1(R), 1(E), 41

[56] References Cited
UNITED STATES PATENTS

| 2,826,420 | 3/1958 | Klingler.................... | 279/4 |
| 3,010,568 | 10/1961 | Annegarn.................... | 279/4X |

Primary Examiner—Andrew R. Juhasz
Assistant Examiner—David R. Melton
Attorney—James H. Bower ABSTRACT: A work holding fixture adapted to minimize clamp distortion of a workpiece by providing a movable metallic collet encompassing the workpiece, and a nonmetallic gland which expands upon pressure to press upon the collet to squeeze the workpiece.

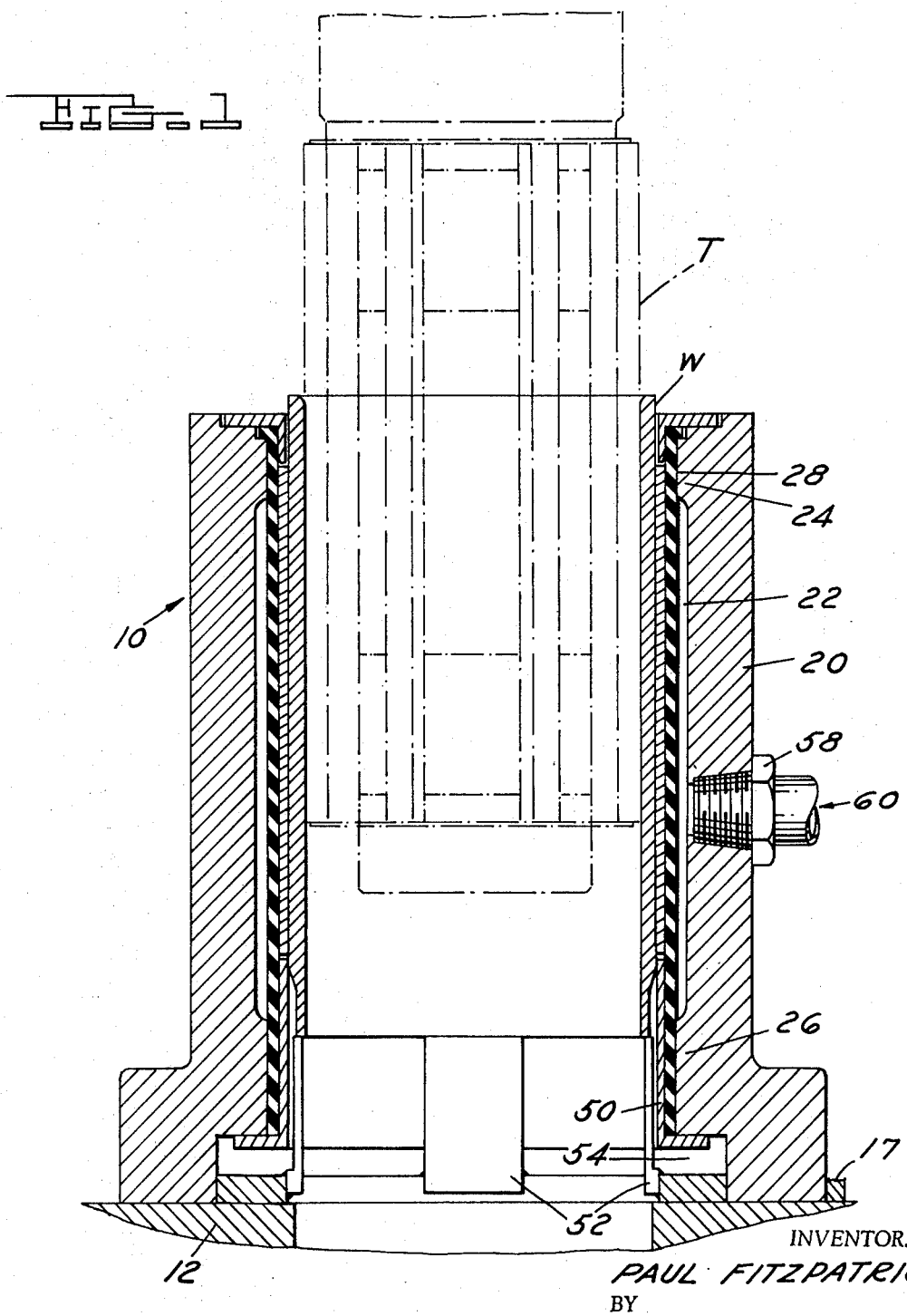

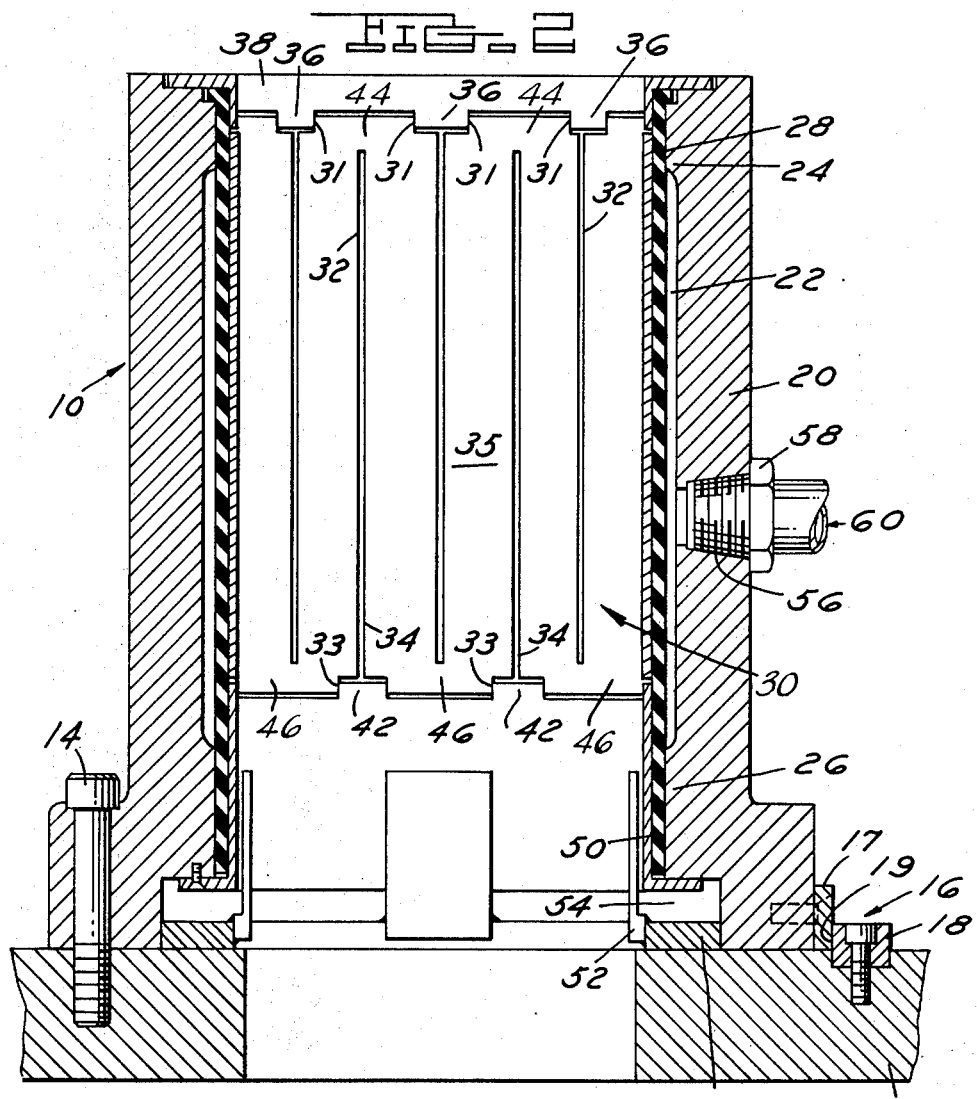
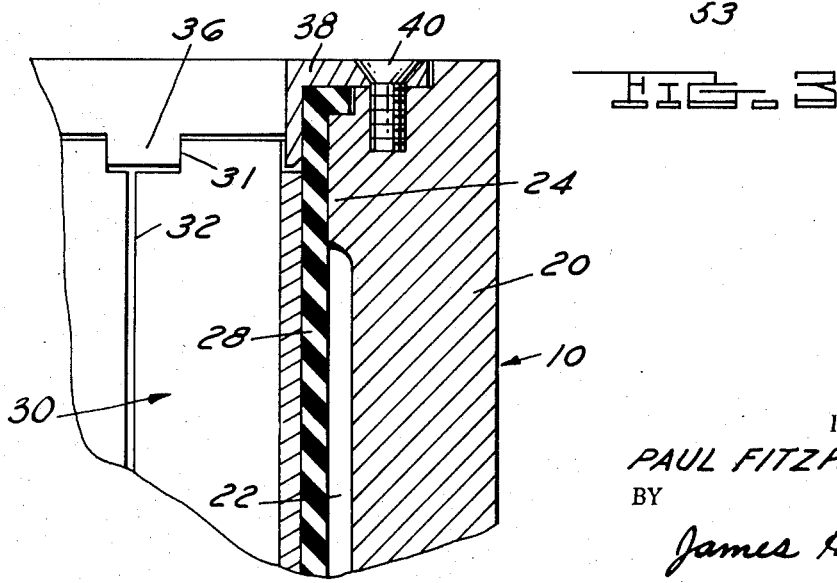

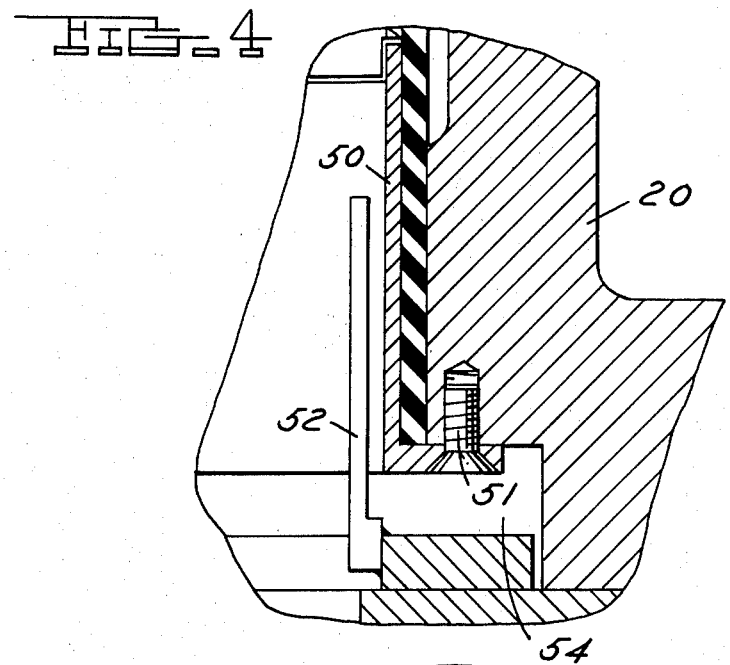
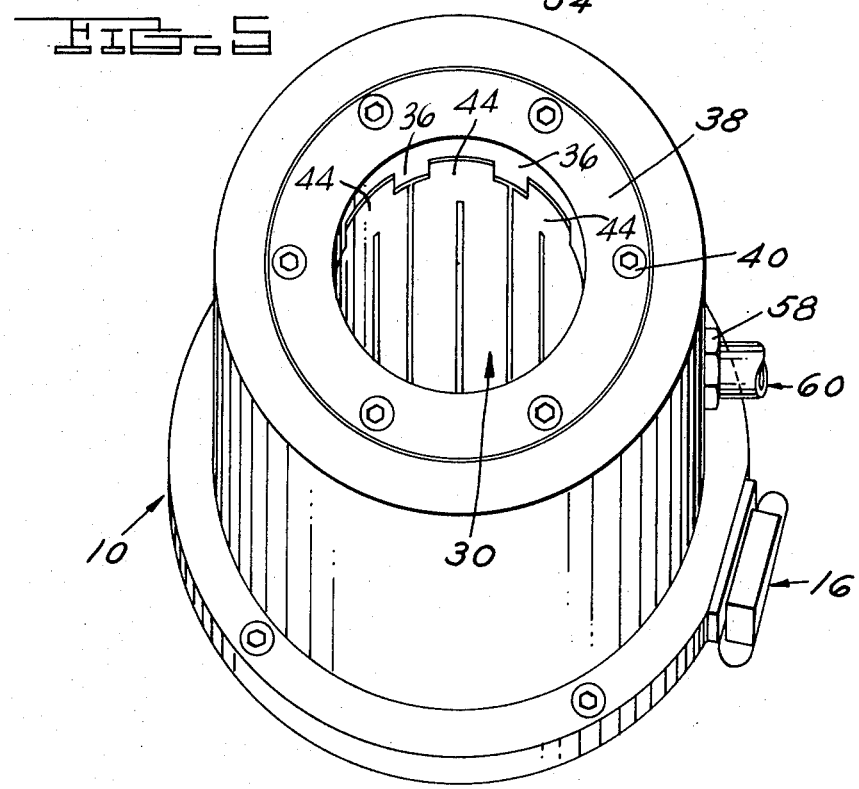

NONDISTORTIVE WORK HOLDING FIXTURE

BACKGROUND OF THE INVENTION

1. Field of the Invention

This invention relates to an improved work holder for supporting and holding cylinder liner in position during a metal stock removal operation, such as honing, abrading or boring. The sleeves or liners are used in connection with the cylinders of internal combustion engines. The internal peripheral surface of the sleeve, or liner must be held to very close tolerances; moreover, the finished sleeve or liner must be substantially perfectly round without any distortion after the honing or abrading operation.

2. Description of the Prior Art

Great difficulty has been experienced in providing adequate work holding devices or fixtures to hold the sleeve in position during the honing operations. In general, mechanical work holding devices have been used where the external surface of the sleeve is gripped or held by means of mechanical devices, however, it was found that out-of-round conditions would occur with these conventional devices since the pressure formed would not be evenly distributed throughout the surface of the workpiece.

Another type of work holder comprised a support having an expansible element adapted to engage the sides of the workpiece and floatingly support the workpiece within the bore by pressure applied to the sides, however, it was found that upon removing of the sleeve it would spring back to its unclamped position which would result in imperfect roundness. This was due because the workpiece could not be adequately and properly clamped on all sides and all portions of the sleeve with an equal pressure. Moreover, it was found that wherever the expansible conduit, whether it be a helical or spiral, conduit was positioned, the conduit would expand and provide an imperfect roundness to the workpiece, consequently, the workpiece would spring back to its unclamped position after it was removed.

A typical patent utilizing a flexible expansible element for holding a sleeve is U.S. Pat. No. 2,720,735, issued Oct. 18, 1955. The patent therein shows a spirally extending recess having an expansible conduit positioned therein. The conduit would expand upon pressure being applied within and would hold the sleeve in position. However, it was noted that the pressure of the expansible conduit provided in out-of-roundness to the sleeve whereby upon removal of the sleeve would spring back to its unclamped position or condition and of course would result in imperfect roundness.

Another typical patent utilizing a flexible expansible element and metallic flange for contact with the workpiece is U.S. Pat. No. 2,534,527, issued Dec. 19, 1950. However, it is noted that the holder is spaced intermittently and moves in a longitudinal direction with respect to holding the workpiece.

SUMMARY OF THE INVENTION

This invention relates to a nondistortive work holding fixture utilizing fluid pressure to move an expansible gland member into a gripping relationship with a metallic collet or sleeve member which ultimately grips and tightens around the outer peripheral surface of a workpiece, such as a sleeve or liner.

BRIEF DESCRIPTION OF THE DRAWINGS

FIG. 1 is a cross-sectional view through an improved work holding fixture, the view including a sleeve positioned within the work holder, and a honing tool T shown in dotted line positioned with the sleeve.

FIG. 2 shows a cross-sectional view through an improved work holder, similar to FIG. 1, the view showing the collet member in a position.

FIG. 3 shows the portion of the work holding fixture holding the gland and collet members in position.

FIG. 4 shows the bottom portion of the work holding fixture holding the gland and collet members.

FIG. 5 shows a perspective view of the work holding fixture.

DESCRIPTION OF THE PREFERRED EMBODIMENT

The holder embodying the present invention may be used on or in connection with various tools or machines and may be employed to handle work parts or elements of various sizes or shapes. The holder 10, shown in FIG. 1, is applied to the base of bed 12 of a machine by a bolt or screw means 14 and it is adjusted by an adjusting means 16 comprising an abutment plate 17 on the tubular body 20 and a cammed adjusting plate 18 secured to the base 12 of the machine. The contact surfaces 19 between the abutment plate 17 and the cammed adjusting plate 18 provides for movement in one direction to aline the tubular body with the spindle. Another adjustment means is provided 90° from the one shown in FIG. 2 to adjust the tubular body in the other direction.

The inner surface of tubular body 20 comprises an annular recessed portion 22 and includes a top shoulder portion 24 and a bottom shoulder portion 26. An annular gland member 28 being made of a suitable rubberlike or other flexible material, such as urethane, is abutted against the inner annular surface of the tubular body 20. The annular gland member seals off the annular recessed portion 22 from the outer atmosphere. An annular collet 30 is inserted within the core of tubular body 20 and covers the inner surface of the annular gland 28. An annular restrictor 38 is secured to the top shoulder portion 24 of tubular body 20 by means of a bolt or screw means 40 as shown in FIG. 3, and holds the collet 30 and annular gland member 28 against the inner annular surface of tubular body 20. A bottom restrictor or locator 50 is secured to the tubular body 20 by means of screws 51 such as shown in FIG. 4, to similarly support and hold collet 30 and annular gland member 28 against the inner surface of tubular body 20.

The collet 30 is comprised of a series of longitudinal slots 32 extending through the thickness of the collet and spaced circumferentially around the collet. As shown in FIG. 2 the slots 32 extend from a top recess 31 on the collet and extend downwardly, but do not extend to the end of the bottom of the collet 30. Another series of slots 34 extend from the bottom recess 33 and extend upwardly toward, but does not extend to the edge of the top of the collet 30. It is apparent that the collet is movable radially inwardly as a result of the slots and yet held to a physical uniform circular configuration thereby. Bight portions 44 and 46 connect the surfaces or panels 35 on the top and bottom respectively of the collet 30. As shown in FIG. 2, slots 32 are parallel with each other, and protrusions 36 and 42 on the upper and lower restrictors fit into the recesses 31 and 33 of the collet, respectively.

The workpiece or part W is adapted to be inserted within the bore of the work holding fixture down to the bottom stop and ejector 52. An annular recess 54 is provided between a bracket 53 connected to the bottom stop and ejector 52 and the extension of the locator 50 such that upon completion of honing or other abrading operations the part is ejected by moving the bottom stop and ejector 52 upwardly. This allows the workpiece or part to move upwardly such that an operator can grasp it and remove it from the bore of the work holding fixture.

The tubular body 20 includes a threaded bore 56 in the side and threaded with a male fitting 58. Fluid under pressure is applied to a pressure line 60 as indicated in FIG. 2 and causes the annular gland 28 to expand away from the recess 22 and contract onto the outer surface of the annular collet 30 and thus hold it in gripping relation with equal and uniform pressure applied to all the peripheral surfaces. The collet 30 now under pressure, is squeezed radially inwardly equally and uniformly throughout its circumferential surface without any distortion of the sleeve taking place. This is because of the panels or surfaces 35 being adjusted throughout the peripheral surface by means of the slots 32 and 34. Since the collet securely holds the workpiece, machining operations may now take place until pressure is released whereby the gland 28 returns to its original condition and thereby releasing the pressure on the collet 30. Thus machining of a workpiece is obtained without any distortion because the pressure applied to the outer peripheral surface of the workpiece is uniformly distributed. It must be understood that the use of the term fluid is to cover any hydraulic pneumatic or fluid means.

Having described only a typical preferred form of my invention I do not wish to be limited or restricted to the specific details herein set forth but wish to reserve any variations or modifications that may appear to those skilled in the art and fall within the scope of the following claims:

I claim:
1. A workpiece holding fixture, comprising:
   a. a tubular body 20 having inner and outer surface portions;
   b. an annular recess 22 on said inner surface portion abutting top 24 and bottom 26 shoulder portions of said tubular body 20;
   c. an annular resilient member 28 abutting said inner surface portion of said tubular body and encompassing said recess 22;
   d. an annular collet 30 abutting said inner surface portion of said resilient member, said annular collet being tubular in shape and including: a circumferential top end and a circumferential bottom end;
      1. a plurality of parallel slots 32, each of said slots extending substantially the longitudinal length of said collet;
      2. a plurality of recesses 31 extending around said circumferential top end, and connecting each alternate slot;
      3. a plurality of recesses 33 extending around said circumferential bottom end, and connecting each alternate slot;
      4. said top and bottom recesses are in alternate arrangement with respect to each other, thereby defining a plurality of longitudinal panel members 35 connected by bight portions at said top 44 and bottom 46 circumferential ends, respectively, and alternately arranged, to form an integral circular member;
   e. means for retaining said resilient member and said collet to the top 38 and bottom 50 shoulder portions, respectively, of said body 20; and
   f. means for delivering fluid to said recess whereby said resilient member is moved against the outer surface of said collet, thereby effecting a gripping relationship of said collet with a workpiece.

2. A workpiece holding fixture, as defined in claim 1; further comprising an ejector means, whereby ejection of the workpiece is effected thereby.

3. An annular collet, comprising:
   a. a circular member having a circumferential top end, and a circumferential bottom end;
   b. a plurality of top recesses, each of said recesses extending from said circumferential top end;
   c. a plurality of bottom recesses, each of said recesses extending from said circumferential bottom end;
   d. a plurality of parallel slots, each of said slots extending substantially the entire longitudinal length of said tubular body; and
   e. each alternating slot connected to said top circumferential recess, and each alternating slot connected to said bottom circumferential recess, said top and bottom recesses are in alternate arrangement with respect to each other thereby defining a plurality of longitudinal panel members connected by bight portions alternately arranged at said top and bottom circumferential ends, respectively, to form an integral circular member.